US011676479B2

(12) United States Patent
Ly-Gagnon et al.

(10) Patent No.: US 11,676,479 B2
(45) Date of Patent: Jun. 13, 2023

(54) PORTABLE ELECTRONIC DEVICES FOR ACCESSING REMOTELY CONTROLLABLE DEVICES

(71) Applicant: Apple Inc., Cupertino, CA (US)

(72) Inventors: Yann Ly-Gagnon, San Francisco, CA (US); Arun Unkn, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 17/359,059

(22) Filed: Jun. 25, 2021

(65) Prior Publication Data

US 2022/0130234 A1   Apr. 28, 2022

Related U.S. Application Data

(60) Provisional application No. 63/106,691, filed on Oct. 28, 2020.

(51) Int. Cl.
| | | |
|---|---|---|
| *G08C 17/02* | (2006.01) | |
| *H04M 1/72412* | (2021.01) | |
| *B60R 25/102* | (2013.01) | |
| *H04W 12/0471* | (2021.01) | |
| *G07C 9/00* | (2020.01) | |
| *H04W 12/33* | (2021.01) | |

(52) U.S. Cl.
CPC ............ *G08C 17/02* (2013.01); *B60R 25/102* (2013.01); *H04M 1/72412* (2021.01); *H04W 12/0471* (2021.01); *G07C 9/00309* (2013.01); *G08C 2201/93* (2013.01); *H04W 12/33* (2021.01)

(58) Field of Classification Search
CPC .. G08C 17/02; G08C 2201/93; B60R 25/102; G07C 9/00309; H04M 1/72412; H04W 12/0471; H04W 12/33
See application file for complete search history.

(56) References Cited

U.S. PATENT DOCUMENTS

| | | | | |
|---|---|---|---|---|
| 9,189,900 | B1* | 11/2015 | Penilla | G06Q 20/308 |
| 2021/0209873 | A1* | 7/2021 | Ghabra | H04W 4/021 |

OTHER PUBLICATIONS

Extended European Search Report directed to related European Patent Application No. 21201458.3, dated Feb. 25, 2022; 9 pages.

\* cited by examiner

*Primary Examiner* — Daniell L Negron
(74) *Attorney, Agent, or Firm* — Sterne, Kessler, Goldstein & Fox P.L.L.C.

(57) ABSTRACT

Multiple portable electronic devices within an exemplary system functionally cooperate amongst themselves to access a remotely controllable device. These portable electronic devices execute exemplary prioritization routines to identify a preferred portable electronic device from among the portable electronic devices to access the remotely controllable device. Thereafter, the exemplary system transfers ownership of a software implemented access token to the preferred portable electronic device to allow the preferred portable electronic device to access the remotely controllable device.

20 Claims, 7 Drawing Sheets

REMOTELY CONTROLLABLE DEVICE
102

PORTABLE ELECTRONIC DEVICES FOR ACCESSING REMOTELY CONTROLLABLE DEVICES

CROSS-REFERENCE TO RELATED APPLICATIONS

The present application claims the benefit of U.S. Provisional Patent Appl. No. 63/106,691, filed Oct. 28, 2020, which is incorporated herein by reference in its entirety.

TECHNICAL FIELD

The described embodiments generally relate to operation of portable electronic devices to access a remotely controllable device, including identifying a preferred portable electronic device from among the portable electronic devices and transferring ownership of a software implemented access token to the preferred portable electronic device to allow the preferred portable electronic device to access the remotely controllable device.

BACKGROUND

Key fobs are small programmable hardware devices that can be used to access to automobiles. Key fobs are often designed to fit in the palm of a person's hand providing a huge convenience for automobile owners to lock and unlock automobiles at the touch of a button. More advanced key fobs can also allow automobile owners to remotely start automobile ignitions, remotely disarm and arm automobile security systems, remotely open automobile trunks, remotely activate panic alarms installed within automobiles, remotely control windows in automobiles, remotely fold in exterior mirrors in automobiles, remotely adjust interior seating in automobiles, and even operate the automobiles themselves. As more automobile owners have access to mobile electronic devices, such as smartphones, tablet computers, and/or smartwatches to provide an example, software applications have been developed for these mobile electronic devices to emulate the functionality of these key fobs.

SUMMARY

Some embodiments of this disclosure describe a first portable electronic device for accessing a remotely controllable device. The first portable electronic device can include a memory and a processor. The memory stores a token indicator indicating ownership of a software implemented access token to access the remotely controllable device. The processor can execute instructions stored in the memory. The instructions, when executed by the processor, can configure the processor to collect information relating to one or more parameters, characteristics, or attributes of multiple portable electronic devices, evaluate the information to identify a preferred portable electronic device to access the remotely controllable device from among multiple portable electronic devices, and transfer ownership of the software implemented access token to a second portable electronic device from among multiple portable electronic devices in response to identifying the second portable electronic device as being the preferred portable electronic device to access the remotely controllable device.

In some embodiments, the first portable electronic device can include a smartphone, and the second portable electronic device can include a smartwatch.

In some embodiments, the first portable electronic device can include a first smartphone and the second portable electronic device can include a second smartphone.

In some embodiments, the instructions, when executed by the processor, can further configure the processor to scan for the remotely controllable device, and stop scanning for the remotely controllable device in response to transferring the ownership of the software implemented access token.

In some embodiments, the one or more parameters, characteristics, or attributes of multiple portable electronic devices can include one or more signal characteristics of one or more electronic signals associated with the first portable electronic device, the second portable electronic device, or the remotely controllable device. In some embodiments, the one or more signal characteristics can include a Received Signal Strength Indicator (RSSI) of an electronic signal being transmitted by the remotely controllable device indicating that the first portable electronic device is in communication range of the remotely controllable device.

In some embodiments, the one or more parameters, characteristics, or attributes of multiple portable electronic devices can include one or more portable electronic device characteristics relating to the configuration or operation of the remotely controllable device or multiple portable electronic devices. In some embodiments, the one or more portable electronic device characteristics can include motion of the first portable electronic device or the second portable device relative to the remotely controllable device.

In some embodiments, the instructions, when executed by the processor, configure the processor to identify the second portable electronic device as being the preferred portable electronic device when the information indicates the second portable electronic device is in motion relative to the remotely controllable device and is within communication range of the remotely controllable device.

In some embodiments, the remotely controllable device can include a vehicle.

Some embodiments of this disclosure describe a method for accessing a remotely controllable device. The method can include collecting information relating to one or more parameters, characteristics, or attributes of multiple portable electronic devices; evaluating the information to identify a preferred portable electronic device to access the remotely controllable device from among multiple portable electronic devices; and transferring ownership of a software implemented access token to a second portable electronic device from among multiple portable electronic devices in response to identifying the second portable electronic device as being the preferred portable electronic device.

In some embodiments, the method can include scanning for the remotely controllable device, and stopping the scanning for the remotely controllable device in response to transferring the ownership of the software implemented access token.

In some embodiments, the one or more parameters, characteristics, or attributes of multiple portable electronic devices can include one or more signal characteristics of one or more electronic signals associated with the first portable electronic device, the second portable electronic device, or the remotely controllable device. In some embodiments, the one or more signal characteristics can include a Received Signal Strength Indicator (RSSI) of an electronic signal being transmitted by the remotely controllable device indicating that the first portable electronic device is in communication range of the remotely controllable device.

In some embodiments, the one or more parameters, characteristics, or attributes of multiple portable electronic devices can include one or more portable electronic device characteristics relating to the configuration or operation of the remotely controllable device or multiple portable electronic devices. In some embodiments, the one or more portable electronic device characteristics can include motion of the first portable electronic device or the second portable device relative to the remotely controllable device.

In some embodiments, wherein the evaluating can include identifying the second portable electronic device as being the preferred portable electronic device when the information indicates the second portable electronic device is in motion relative to the remotely controllable device and is within communication range of the remotely controllable device.

In some embodiments, the remotely controllable device can include a vehicle.

Some embodiments of this disclosure describe a smartphone for accessing a vehicle. The smartphone can include a memory and a processor. The memory can store a token indicator indicating ownership of a software implemented access token to access the vehicle. The processor can collect information relating to one or more parameters, characteristics, or attributes of the vehicle and a smartwatch, evaluate the information to identify whether the smartphone or the smartwatch is to access the vehicle, and transfer ownership of the software implemented access token to the smartwatch in response to identifying the smartwatch is to access the vehicle.

In some embodiments, the processor can identify the smartwatch is to access the vehicle when the information indicates the smartwatch is in motion relative to the vehicle and is within communication range of the vehicle.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

Multiple portable electronic devices within an exemplary system functionally cooperate amongst themselves to access a remotely controllable device. These portable electronic devices execute exemplary prioritization routines to identify a preferred portable electronic device from among the portable electronic devices to access the remotely controllable device. Thereafter, the exemplary system transfers ownership of a software implemented access token to the preferred portable electronic device to allow the preferred portable electronic device to access the remotely controllable device.

Exemplary System

Figure 1:
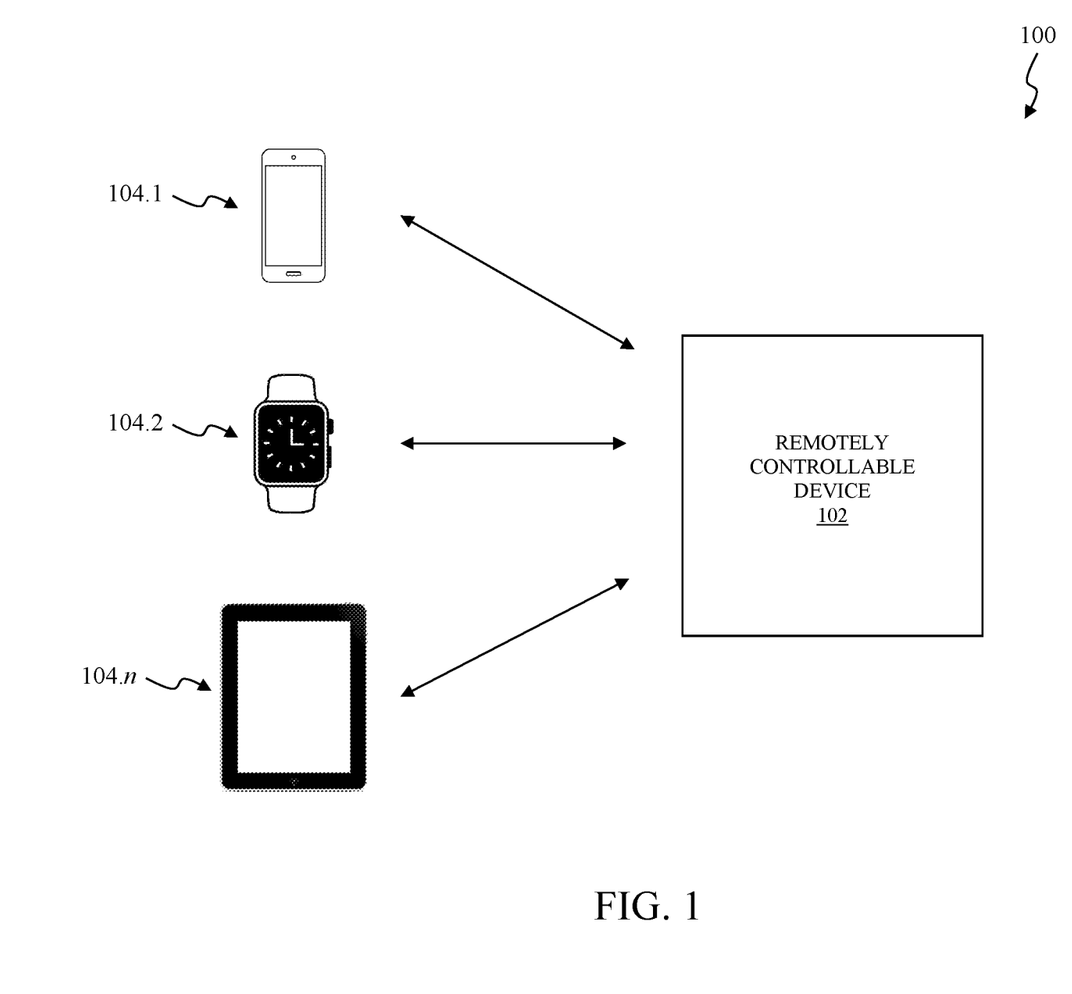
FIG. 1 graphically illustrates an exemplary system in accordance with various embodiments.

FIG. 1 graphically illustrates an exemplary system in accordance with various embodiments. In the exemplary embodiment illustrated in FIG. 1, an exemplary system 100 selectively controls access to a remotely controllable device. As to be described in further detail below, portable electronic devices within the exemplary system 100 functionally cooperate amongst themselves to access the remotely controllable device. These portable electronic devices execute exemplary prioritization routines to identify a preferred portable electronic device from among the portable electronic devices to access the remotely controllable device. Thereafter, the exemplary system 100 transfers ownership of a software implemented access token to the preferred portable electronic device to allow the preferred portable electronic device to access the remotely controllable device. As illustrated in FIG. 1, the exemplary system 100 includes a remotely controllable device 102 and portable electronic devices 104.1 through 104.n. Generally, the remotely controllable device 102 represents any suitable electrical, mechanical, and/or electro-mechanical device that can be accessed using the teachings herein without departing from the spirit and scope of the present disclosure. In some embodiments, this suitable electrical, mechanical, and/or electro-mechanical device can include a vehicle, such as an automobile, a bus, a camper, a boat, an airplane, and/or a helicopter to provide some examples, a security system, an electronic door lock, an electronic garage door opener, an electronic gate, an elevator, and/or a lighting system to provide some examples.

In the exemplary embodiment illustrated in FIG. 1, the portable electronic devices 104.1 through 104.n functionally cooperate amongst themselves to access the remotely controllable device 102. As to be described in further detail below, the portable electronic devices 104.1 through 104.n execute exemplary prioritization routines to identify a preferred portable electronic device from among the portable electronic devices 104.1 through 104.n, where the preferred portable electronic device is transferred ownership of a software implemented access token to access the remotely controllable device 102. In some embodiments, one or more of the portable electronic devices 104.1 through 104.$n$ simultaneously, or near-simultaneously, execute the prioritization routines to identify the preferred portable electronic device. As part of these exemplary prioritization routines, each of the portable electronic devices 104.1 through 104.$n$ can collect information relating to one or more parameters, characteristics, and/or attributes of the remotely controllable device 102 and/or the portable electronic devices 104.1 through 104.$n$. In some embodiments, the portable electronic devices 104.1 through 104.$n$ can poll the remotely controllable device 102 and/or one another to provide their information. In some embodiments, the one or more parameters, characteristics, and/or attributes can be related to one or more signal characteristics, such as one or more signal parameters, for example, received signal strengths, transmitted signal strengths, signal to noise ratios (SNRs), and/or signal-to-interference-plus-noise ratios (SINRs) of various electronic signals within the exemplary system 100; and/or one or more portable electronic device characteristics relating to the configuration and/or operation of the remotely controllable device 102 and/or the portable electronic devices 104.1 through 104.$n$, such as motions, battery charge, battery capacities, communication capabilities, for example, Wi-Fi communication capabilities, Bluetooth communication capabilities' and/or near field communication capabilities (NFC), usages including video, audio, and/or data transmissions, or operating states including low power mode or screen-on.

After collecting the information, the portable electronic devices 104.1 through 104.$n$ can evaluate the information to identify the preferred portable electronic device to access the remotely controllable device 102. In some embodiments, each of the portable electronic devices 104.1 through 104.$n$ can compare the information collected from the portable electronic devices 104.1 through 104.$n$ with one another to identify the preferred portable electronic device. For example, the portable electronic devices 104.1 through 104.$n$ can compare the information to identify the preferred portable electronic device as being a portable electronic device from among the portable electronic devices 104.1 through 104.$n$ whose portable electronic device characteristics indicate that it is in motion and/or whose signal characteristics indicate that it within communication range of the remotely controllable device 102 when compare to other connections of other portable electronic devices 104.1 through 104.$n$. Once the preferred portable electronic device has been identified, the portable electronic devices 104.1 through 104.$n$ transfer ownership of the software implemented access token to the preferred portable electronic device to access the remotely controllable device 102. In some embodiments, a portable electronic device which presently has ownership of the software implemented access token from among the portable electronic devices 104.1 through 104.$n$ can retain the software implemented access token when this portable electronic device continues to be identified as the preferred portable electronic device to access the remotely controllable device 102. In some embodiments, this transfer of ownership can be in the form of a push whereby a previous preferred portable electronic device from among the portable electronic devices 104.1 through 104.$n$ that presently has ownership of the software implemented access token, but is no longer identified as the preferred portable electronic device, transfers ownership of the software implemented access token to the preferred portable electronic device. In some embodiments, this transfer of ownership can be in the form of a pull whereby the preferred portable electronic device transfers ownership of the software implemented access token from the previous preferred portable electronic device to itself.

After ownership of the software implemented access token has been established, the preferred portable electronic device establishes a communication session, for example, a secure connection, with the remotely controllable device 102. In some embodiments, the preferred portable electronic device scans the exemplary system 100 for the remotely controllable device 102. Upon discovering the remotely controllable device 102, the preferred portable electronic device sends one or more digital credentials for comparison with one or more corresponding digital credentials stored within to the remotely controllable device 102 for authorization and/or authentication. The one or more digital credentials can represent one or more unique identifiers that are associated with: one or more of the portable electronic devices 104.1 through 104.$n$, such as one or more Media Access Control (MAC) addresses or one or more Internet Protocol (IP) addresses; one or more users of the portable electronic devices 104.1 through 104.$n$, such as one or more usernames and/or one or more passwords; the remotely controllable device 102, such as a vehicle identification number (VIN), and/or any combination thereof. Alternatively, or in addition to, the one or more digital credentials can represent a public security key and/or a private security key that can be generated and disseminated using any well-known cryptographic algorithm that will be apparent to those skilled in the relevant art(s) without departing from the spirit and scope of the present disclosure. After the remotely controllable device 102 authorizes and/or authenticates the preferred portable electronic device using the one or more digital credentials, the remotely controllable device 102 establishes the communication session allowing the preferred portable electronic device, which has ownership of the software implemented access token, to access the remotely controllable device 102.

After the communication session has been established between the remotely controllable device 102 and the preferred portable electronic device, the remotely controllable device 102 can execute one or more predesignated actions. In some embodiments, the one or more predesignated actions can represent one or more passive actions and/or one or more active actions. The one or more passive actions can represent one or more actions performed by the remotely controllable device 102 without explicit commands being provided by the preferred portable electronic device. For example, in some embodiments, the one or more passive actions can include the remotely controllable device 102 scanning for a location of the preferred portable electronic device within the exemplary system 100. In these embodiments, once the preferred portable electronic device is within a predetermined range from the remotely controllable device 102, the remotely controllable device 102 can perform one or more passive actions, such as activating the remotely controllable device 102, disarming or arming the remotely controllable device 102, unlocking or locking the remotely controllable device 102, and/or adjusting one or more components of the remotely controllable device 102. On the other hand, the one or more active actions can represent one or more actions performed by the remotely controllable device 102 using explicit commands being provided by the preferred portable electronic device via the communication session. For example, in some embodiments, the one or more active actions can include the remotely controllable device 102 scanning for the location of the preferred portable electronic device within the exemplary system 100. In these embodiments, once the preferred portable electronic device is within the predetermined range from the remotely controllable device 102, the remotely controllable device 102 can begin to listen for one or more commands from preferred portable electronic device via the communication session. These one or more commands can include suitable commands to activate the remotely controllable device 102, disarm and/or arm the remotely controllable device, unlock or lock the remotely controllable device 102, control one or more features of the remotely controllable device 102, adjust one or more components of remotely controllable device 102, and even operate the remotely controllable device 102 itself to provide some examples.

Figure 2:
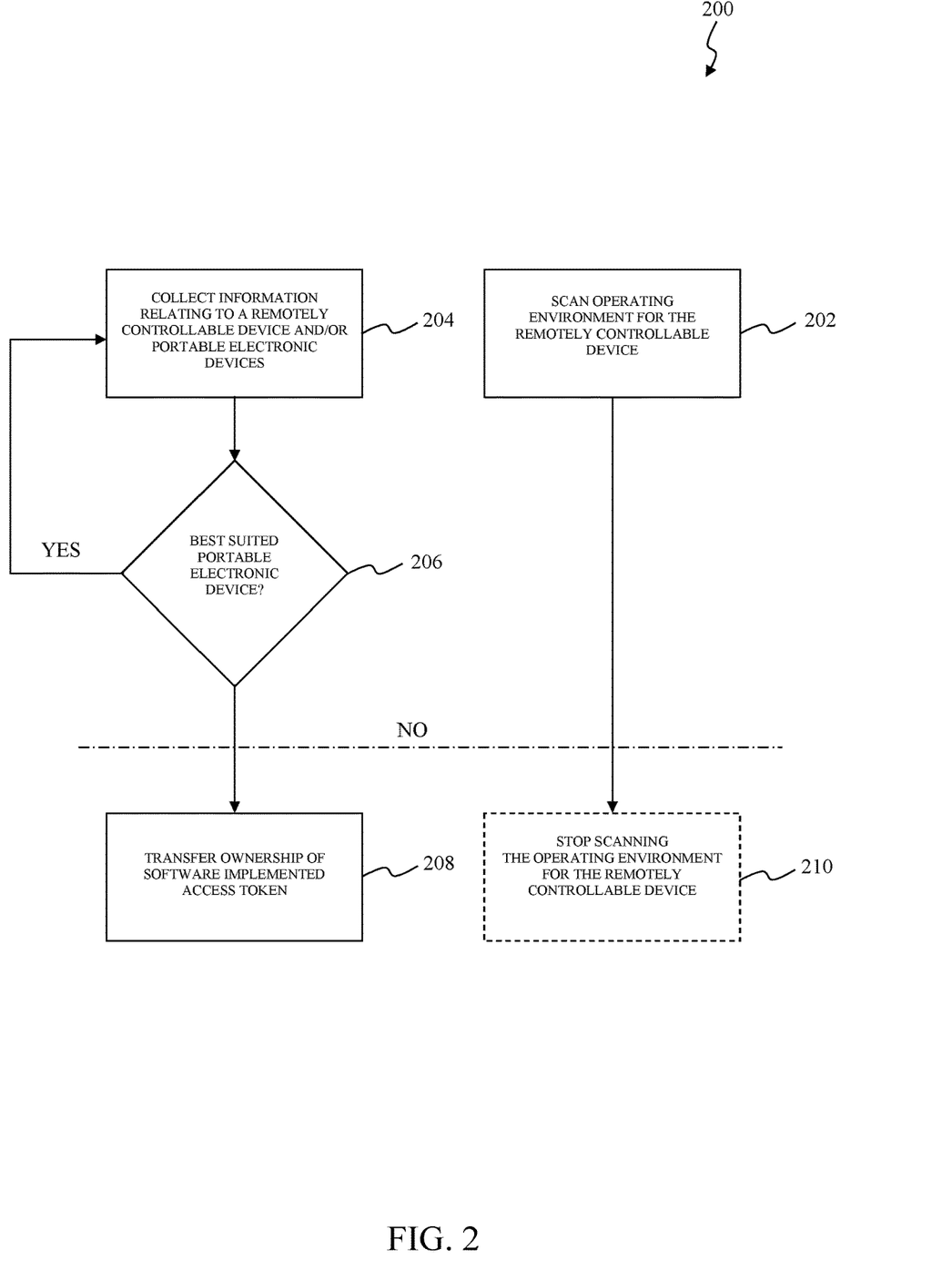
FIG. 2 illustrates a flowchart of a first exemplary prioritization routine to identify a preferred portable electronic device within the exemplary system in accordance with various embodiments.

Exemplary Prioritization Routines to Identify a Preferred Portable Electronic Device within the Exemplary System FIG. 2 illustrates a flowchart of a first exemplary prioritization routine to identify a preferred portable electronic device within the exemplary system in accordance with various embodiments. The disclosure is not limited to this operational description. Rather, it will be apparent to ordinary persons skilled in the relevant art(s) that other operational control flows are within the scope and spirit of the present disclosure. The following discussion describes an exemplary operational control flow 200 to determine a preferred portable electronic device from among multiple portable electronic devices, such as the portable electronic devices 104.1 through 104.*n* as described above in FIG. 1, to access a remotely controllable device, such as the remotely controllable device 102 as described above in FIG. 1. In the exemplary embodiment illustrated in FIG. 3, the exemplary operational control flow 200 can be performed by a portable electronic device, such as one of the portable electronic devices 104.1 through 104.*n* as described above in FIG. 1, which presently has ownership of the software implemented access token to access the remotely controllable device.

At operation 202, the portable electronic device scans an system, such as exemplary system 100 as described above, for the remotely controllable device.

At operation 204, the portable electronic device collects information relating to the remotely controllable device from operation 202 and/or the multiple portable electronic devices. In some embodiments, the portable electronic device can perform operation 202 in parallel, namely, simultaneously, with operation 204 as illustrated in FIG. 2. In some embodiments, the portable electronic device can collect information relating to one or more parameters, characteristics, and/or attributes of the remotely controllable device and/or the multiple portable electronic devices. In some embodiments, the one or more parameters, characteristics, and/or attributes can be related to one or more signal characteristics, such as one or more signal parameters, for example, received signal strengths, transmitted signal strengths, signal to noise ratios (SNRs), and/or signal-to-interference-plus-noise ratios (SINRs); and/or one or more portable electronic device characteristics, such as motions, battery capacities, communication capabilities, for example, Wi-Fi communication capabilities, Bluetooth communication capabilities' and/or near field communication capabilities (NFC), usages including video, audio, and/or data transmissions, or operating states including low power mode or screen-on. In some embodiments, the portable electronic device can poll the remotely controllable device and/or the multiple portable electronic devices to provide the information.

At operation 206, the portable electronic device, which presently has ownership of the software implemented access token, determines whether it is the preferred portable electronic device from among the multiple portable electronic devices from the information from operation 204. In some embodiments, the portable electronic device compares the information from operation 204 collected from the remotely controllable device from operation 202 and/or the multiple portable electronic devices with one another to determine whether it is the preferred portable electronic device. The portable electronic device proceeds to operation 208 to transfer ownership of the software implemented access token when the portable electronic device determines it is not the preferred portable electronic device. Otherwise, the portable electronic device reverts to operation 204 to continue to collect the information.

At operation 208, the portable electronic device transfers ownership of the software implemented access token to the preferred portable electronic device. In some embodiments, this transfer of ownership can be in the form of a push whereby the portable electronic device, which presently has ownership of the software implemented access token, transfers ownership of the software implemented access token to the preferred portable electronic device. In some embodiments, the portable electronic device can store an token indicator, such as a software flag to provide an example, indicating whether it has ownership of the software implemented access token. In these embodiments, the portable electronic device can set the token indicator to indicate that it no longer has ownership of the software implemented access token once the ownership of the software implemented access token has been transferred to the preferred portable electronic device.

At operation 210, the portable electronic device can optionally stop scanning for the remotely controllable device in response to transferring the ownership of the software implemented access token from operation 208.

Figure 3:
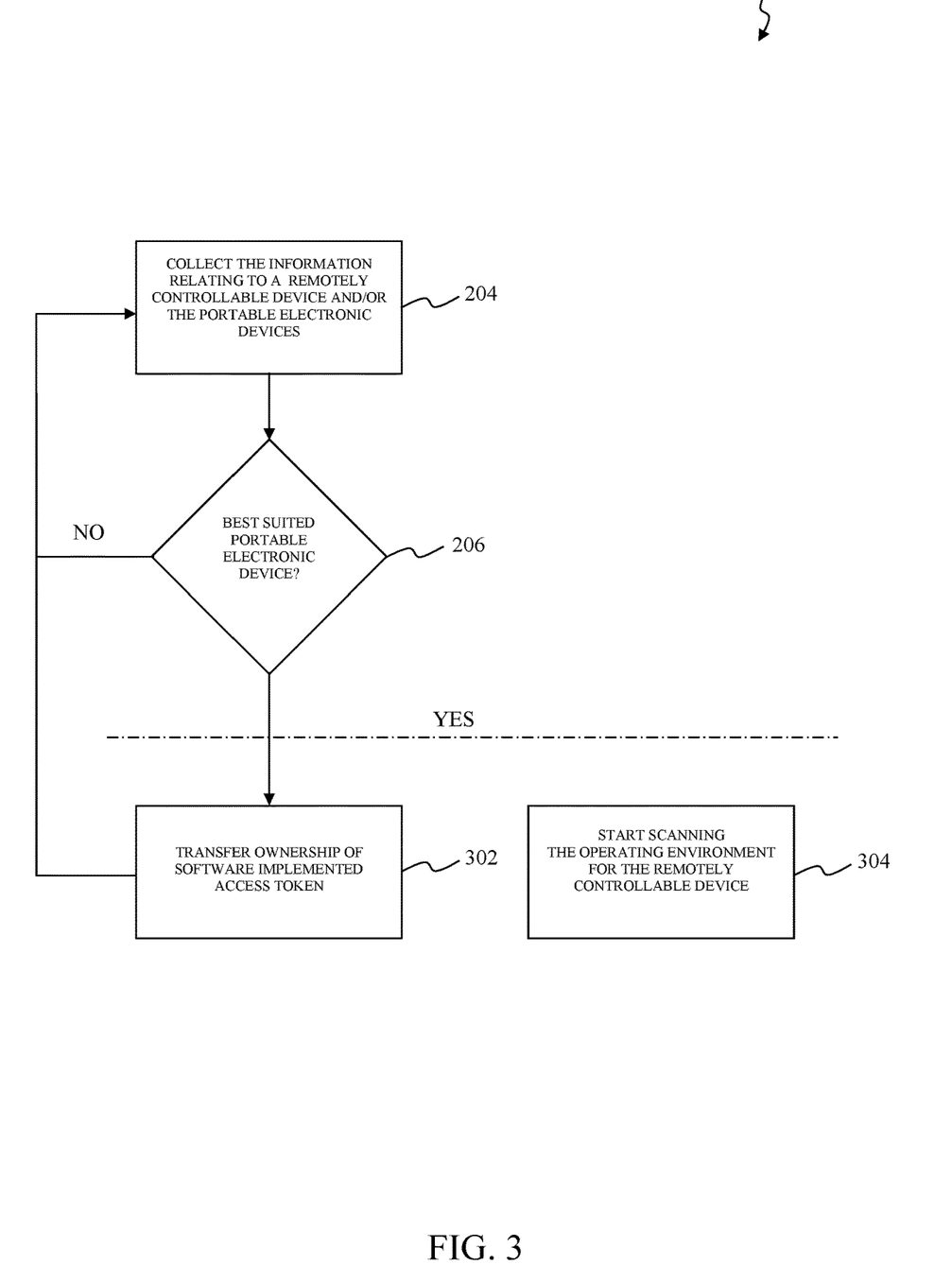
FIG. 3 illustrates a flowchart of a second exemplary prioritization routine to identify the preferred portable electronic device within the exemplary system in accordance with various embodiments.

FIG. 3 illustrates a flowchart of a second exemplary prioritization routine to identify the preferred portable electronic device within the exemplary system in accordance with various embodiments. The disclosure is not limited to this operational description. Rather, it will be apparent to ordinary persons skilled in the relevant art(s) that other operational control flows are within the scope and spirit of the present disclosure. The following discussion describes an exemplary operational control flow 300 to determine a preferred portable electronic device from among multiple portable electronic devices, such as the portable electronic devices 104.1 through 104.*n* as described above in FIG. 1, to access a remotely controllable device, such as the remotely controllable device 102 as described above in FIG. 1. In the exemplary embodiment illustrated in FIG. 3, the exemplary operational control flow 300 can be performed by a portable electronic device, such as one of the portable electronic devices 104.1 through 104.*n* as described above in FIG. 1, which presently does not have ownership of the software implemented access token to access the remotely controllable device. The exemplary operational control flow 300 shares many substantially similar features as the exemplary operational control flow 200 as described above in FIG. 2; therefore, only differences between the exemplary operational control flow 300 and the exemplary operational control flow 200 are to be described in further detail below.

At operation 204, the portable electronic device collects information relating to the remotely controllable device and/or the multiple portable electronic devices in a substantially similar manner as described above in FIG. 2.

At operation 206, the portable electronic device, which presently does not have ownership of the software implemented access token, determines whether it is the preferred portable electronic device from among the multiple portable electronic devices from the information from operation 204 in a substantially similar manner as described above in FIG. 2. The portable electronic device proceeds to operation 302 to acquire ownership of the software implemented access token when the portable electronic device determines it is the preferred portable electronic device. Otherwise, the portable electronic device reverts to operation 204 to continue to collect the information when it is not the preferred portable electronic device.

At operation 302, the portable electronic device acquires ownership of the software implemented access token from a previously preferred portable electronic device from among the multiple portable electronic devices. In some embodiments, this transfer of ownership can be in the form of a pull whereby the portable electronic device acquires ownership of the software implemented access token from the previously preferred portable electronic device. In some embodiments, the portable electronic device can store an token indicator, such as a software flag to provide an example, indicating whether it has ownership of the software implemented access token. In these embodiments, the portable electronic device can set the token indicator to indicate that it has ownership of the software implemented access token once the ownership of the software implemented access token has been acquired from the previously preferred portable electronic device.

At operation 304, the portable electronic device can start scanning for the remotely controllable device in response to acquiring ownership of the software implemented access token from operation 302.

Exemplary Portable Electronic Device

Figure 4:
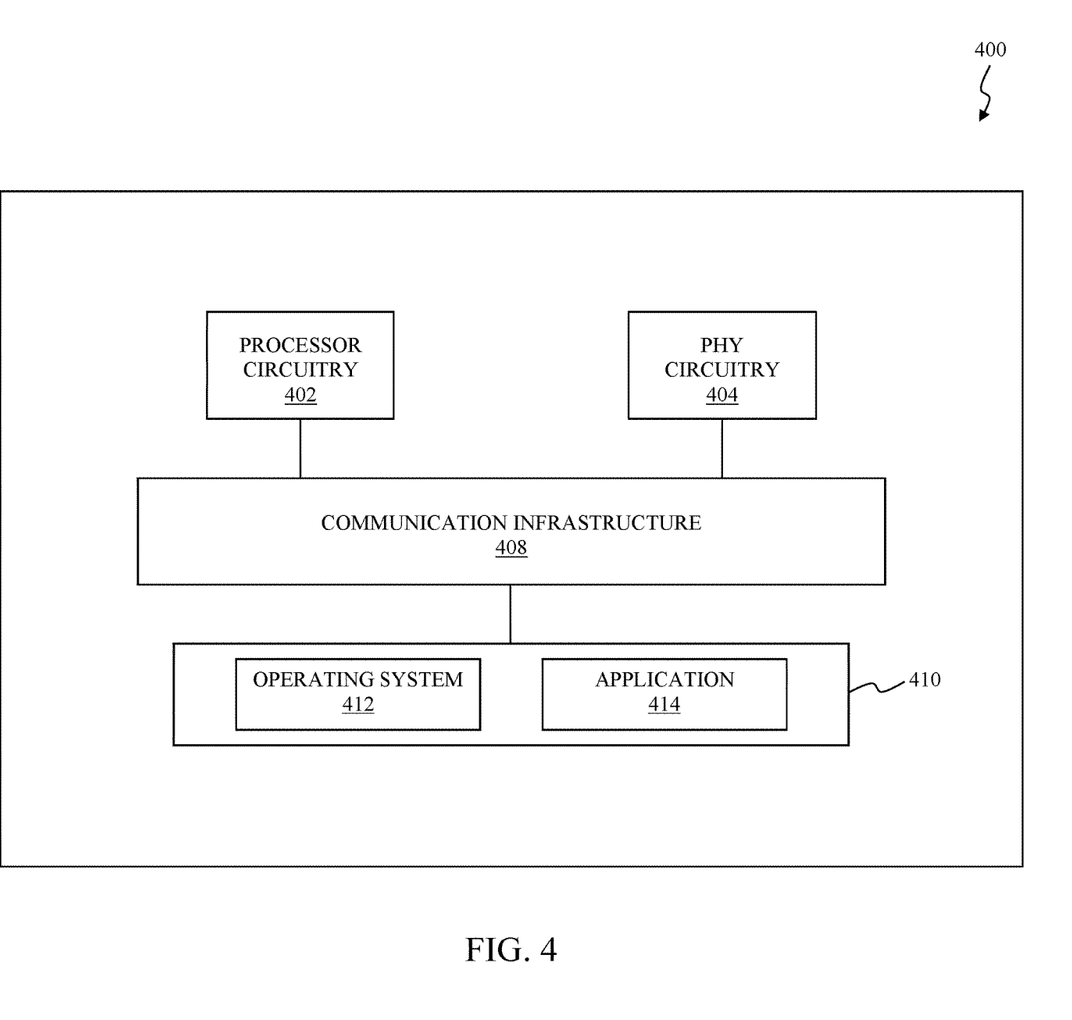
FIG. 4 illustrates a block diagram of an exemplary portable electronic device that can be implemented within the exemplary system in accordance with various embodiments.

FIG. 4 illustrates a block diagram of an exemplary portable electronic device that can be implemented within the exemplary system in accordance with various embodiments. The discussion of FIG. 4 to follow is to describe a portable electronic device 400. The portable electronic device can represent an exemplary embodiment of one or more of the portable electronic devices 104.1 through 104.n as described above in FIG. 1. In the exemplary embodiment illustrated in FIG. 4, the portable electronic device 400 can include processor circuitry 402, physical layer (PHY) circuitry 404, a communication infrastructure 408, and a memory 410. The portable electronic device 400 as illustrated in FIG. 4 can be implemented as a standalone, or a discrete device, and/or can be incorporated within or coupled to another electrical device, or host device, such as a wireless communication device, a smart phone, a laptop computing device, a desktop computing device, a tablet computing device, a personal assistant device, a monitor, a television, a wearable device, and/or any other suitable electronic device that will be apparent to those skilled in the relevant art(s) without departing from the spirit and scope of the disclosure.

In the exemplary embodiment illustrated in FIG. 4, the processor circuitry 402 can include, or can be, any of a microprocessor, graphics processing unit, or digital signal processor, and their electronic processing equivalents, such as an Application Specific Integrated Circuit (ASIC) or Field Programmable Gate Array (FPGA). The processor circuitry 402 signifies one or more tangible data and information processing devices that physically transform data and information, typically using a sequence transformation, also referred to as an operational control flow, such as the operational control flow 200 as described above in FIG. 2 and/or the operational control flow 300 as described above in FIG. 3. Data and information can be physically represented by an electrical, magnetic, optical or acoustical signal that is capable of being stored, accessed, transferred, combined, compared, or otherwise manipulated by the processor circuitry 402. The processor circuitry 402 can signify a singular processor and multi-core systems or multi-processor arrays, including graphic processing units, digital signal processors, digital processors or combinations of these elements.

The PHY circuitry 404 includes circuitry and/or control logic to carry out various radio/network protocol and radio control functions that enable communication with one or more radio networks. The radio control functions can include, but are not limited to, signal modulation/demodulation, encoding/decoding, and/or radio frequency shifting to provide some examples. In some embodiments, the PHY circuitry 404 can perform Fast-Fourier Transform (FFT), pre-coding, and/or constellation mapping/de-mapping functionality. In some embodiments, the PHY circuitry 404 can perform convolution, tail-biting convolution, turbo, Viterbi, and/or Low-Density Parity Check (LDPC) encoding/decoding. In the exemplary embodiment illustrated in FIG. 4, the PHY circuitry 404 can connect to and communicate on wireline and/or wireless networks. For example, the PHY circuitry 404 can include a wireless subsystem, for example, cellular subsystem, a WLAN subsystem, and/or a Bluetooth subsystem, having various wireless radio transceiver and wireless protocol(s) as will be understood by those skilled in the relevant art(s) without departing from the sprit and scope of the disclosure. The wireless subsystem can include circuitry and/or control logic for connecting to and communicating on wireless networks. The wireless networks can include cellular networks such as, but are not limited to, 3G/4G/5G wireless networks, Long-Term Evolution (LTE) wireless networks, and the like to provide some examples.

The memory 410 includes a number of memories including a main random-access memory (RAM), or other volatile storage device, for storage of instructions and data during program execution and/or a read only memory (ROM) in which instructions are stored. The memory 410 can provides persistent storage for program and data files, and may include a hard disk drive, a floppy disk drive along with associated removable media, a CD-ROM drive, an optical drive, a flash memory, or removable media cartridges. In the exemplary embodiment illustrated in FIG. 4, the memory 410 can optionally include an operating system 412 and an application 414. In some embodiments, the memory 410 stores instructions that when executed by the processor circuitry 402 perform the functions described herein, including the prioritization routines described in FIG. 2 through FIG. 3. The operating system 412 can be Microsoft's Windows, Sun Microsystems's Solaris, Apple Computer's MacOs, Linux or UNIX to provide some examples. The computer system also typically can include a Basic Input/Output System (BIOS) and processor firmware. The operating system, the BIOS, and/or the firmware can be used by the processor circuitry 402 to control the PHY circuitry 404, the communication infrastructure 408, and/or the memory 410. In some embodiments, the operating system 412 maintains one or more network protocol stacks, such as an Internet Protocol (IP) stack, and/or a cellular protocol stack to provide some examples, that can include a number of logical layers. At corresponding layers of the protocol stack, the operating system 412 includes control mechanism and data structures to perform the functions associated with that layer. The application 414 can include applications, for example, used by the portable electronic device 400 and/or a user of portable electronic device 400. The applications in application 254 can include applications such as, but not limited to, Siri, FaceTime, radio streaming, video streaming, remote control, and/or other user applications which will be recognized by those skilled in the relevant art(s) without departing from the spirit and scope of the disclosure.

Exemplary Embodiments of Exemplary System

Figure 5:
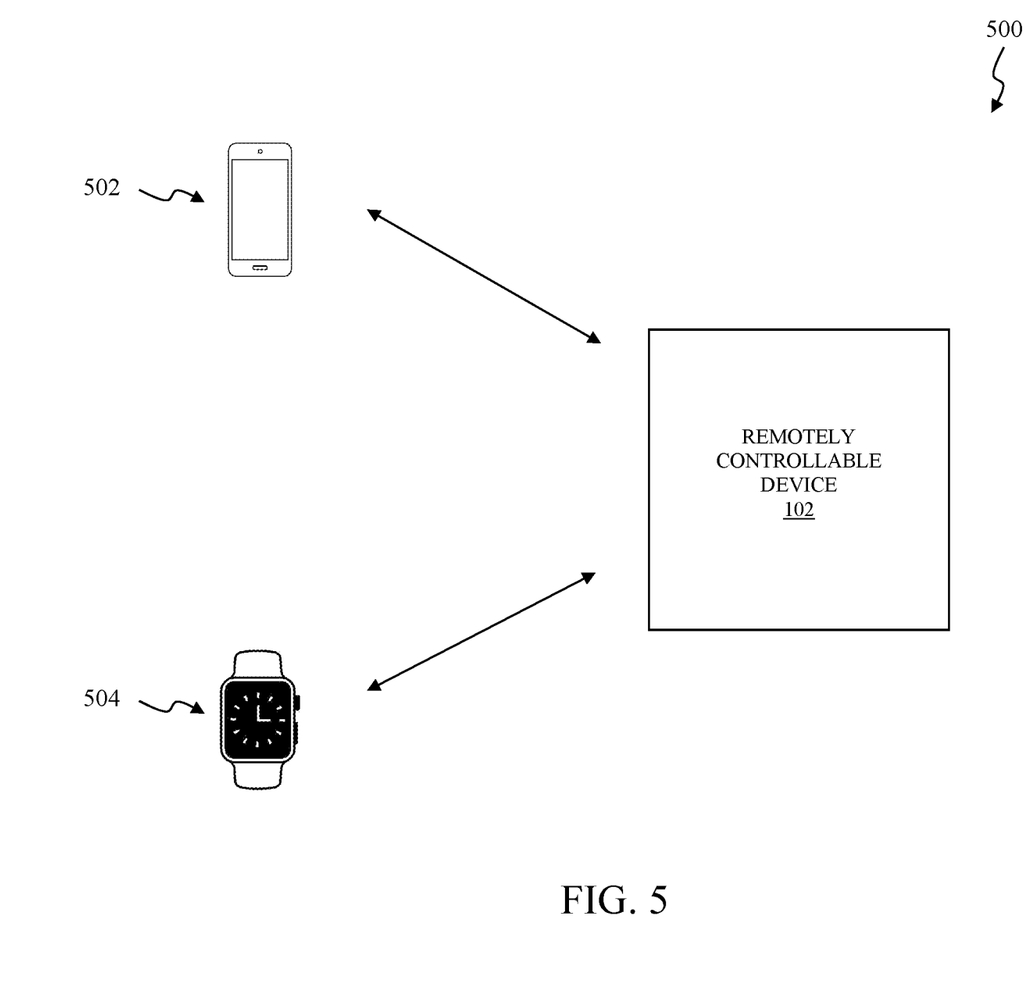
FIG. 5 graphically illustrates a first heterogeneous exemplary system having one or more smartphones and one or more smartwatches in accordance with various embodiments.

FIG. 5 graphically illustrates a first heterogeneous exemplary system having one or more smartphones and one or more smartwatches in accordance with various embodiments. In the exemplary embodiment illustrated in FIG. 5, an exemplary system 500 selectively controls access to a remotely controllable device, such as the remotely controllable device 102 as described above in FIG. 1. As to be described in further detail below, portable electronic devices within the exemplary system 500 functionally cooperate amongst themselves to access the remotely controllable device. These portable electronic devices execute exemplary prioritization routines to identify a preferred portable electronic device from among the portable electronic devices to access the remotely controllable device. Thereafter, the exemplary system 500 pushes ownership of a software implemented access token to the preferred portable electronic device to allow the preferred portable electronic device to access the remotely controllable device. As illustrated in FIG. 5, the exemplary system 500 includes the remotely controllable device 102, a smartphone 502, and a smartwatch 504 to provide an example. The smartphone 502 and the smartwatch 504 can represent exemplary embodiments of two of the portable electronic devices from among the portable electronic devices 104.1 through 104.n as described above in FIG. 1.

In the exemplary embodiment illustrated in FIG. 5, the smartphone 502 and the smartwatch 504 functionally cooperate amongst themselves to access the remotely controllable device 102. As to be described in further detail below, the smartphone 502 and the smartwatch 504 execute exemplary prioritization routines to identify a preferred portable electronic device from among the smartphone 502 and the smartwatch 504 to transfer ownership, if necessary, of a software implemented access token needed to access the remotely controllable device 102. In some embodiments, the smartphone 502 and the smartwatch 504 simultaneously, or near-simultaneously, execute the prioritization routines to identify the preferred portable electronic device. As part of these exemplary prioritization routines, the smartphone 502 and the smartwatch 504 can collect information relating to one or more parameters, characteristics, and/or attributes of the remotely controllable device 102, the smartphone 502, and the smartwatch 504. In some embodiments, the one or more parameters, characteristics, and/or attributes can be related to the motions, or the relative motions, of the smartphone 502 and the smartwatch 504 and/or the communication capabilities, for example, range, of the remotely controllable device 102.

After collecting the information, the smartphone 502 and the smartwatch 504 can evaluate the information to identify the preferred portable electronic device to access the remotely controllable device 102. In some embodiments, the preferred portable electronic device is identified as a portable electronic device from among the smartphone 502 and the smartwatch 504 that is in motion relative to the remotely controllable device 102 and/or is in communication range of the remotely controllable device 102 as indicated by, for example, Received Signal Strength Indicators (RSSIs) provided by the smartphone 502 and the smartwatch 504. In some embodiments, the smartphone 502 can be identified as the preferred portable electronic device when the smartphone 502 is in motion relative to the remotely controllable device 102 and is in communication range of the remotely controllable device 102. In some embodiments, the smartwatch 504 can be identified as the preferred portable electronic device when, the smartphone 502 is stationary, or near-stationary, to relative to the remotely controllable device 102 and the smartwatch 504 is in motion relative to the remotely controllable device 102, for example, towards the remotely controllable device 102, and is in communication range of the remotely controllable device 102. Once the preferred portable electronic device has been identified, the smartphone 502 and/or the smartwatch 504 transfer ownership of the software implemented access token to the preferred portable electronic device to access the remotely controllable device 102. In some embodiments, this transfer of ownership can be in the form of a push whereby a previous preferred portable electronic device from among the smartphone 502 and the smartwatch 504 that presently has ownership of the software implemented access token, but is no longer identified as the preferred portable electronic device, transfers ownership of the software implemented access token to the preferred portable electronic device. In some embodiments, the smartphone 502, which presently has ownership of the software implemented access token, pushes the ownership of the software implemented access token to the smartwatch 504 in response to the smartwatch 504 being identified as the preferred portable electronic device. After ownership of the software implemented access token is transferred, the preferred portable electronic device accesses the remotely controllable device as described above in FIG. 1.

Figure 6:
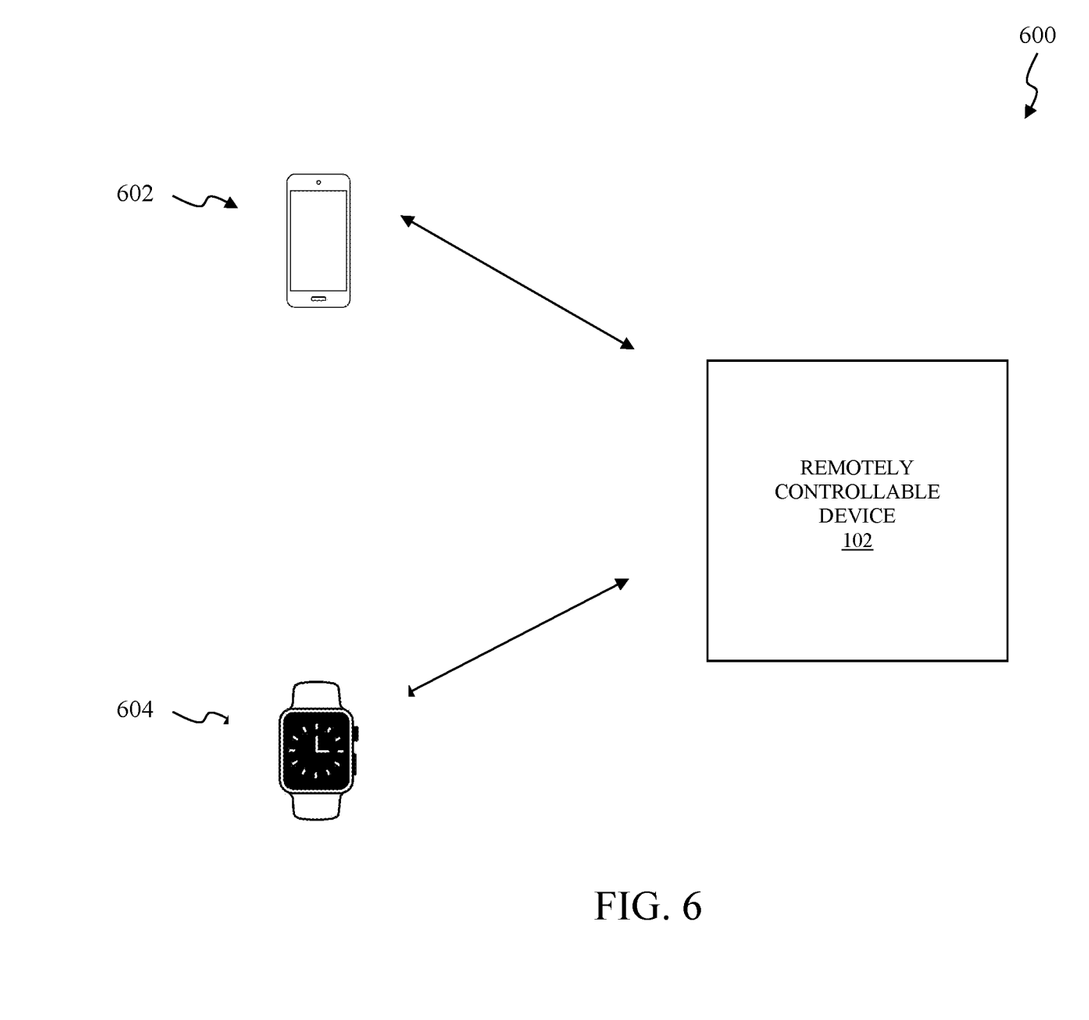
FIG. 6 graphically illustrates a second heterogeneous exemplary system having one or more smartphones and one or more smartwatches in accordance with various embodiments.

FIG. 6 graphically illustrates a second heterogeneous exemplary system having one or more smartphones and one or more smartwatches in accordance with various embodiments. In the exemplary embodiment illustrated in FIG. 6, an exemplary system 600 selectively controls access to a remotely controllable device, such as the remotely controllable device 102 as described above in FIG. 1. As to be described in further detail below, portable electronic devices within the exemplary system 600 functionally cooperate amongst themselves to access the remotely controllable device. These portable electronic devices execute exemplary prioritization routines to identify a preferred portable electronic device from among the portable electronic devices to access the remotely controllable device. Thereafter, the exemplary system 600 pulls ownership of a software implemented access token to the preferred portable electronic device to allow the preferred portable electronic device to access the remotely controllable device. As illustrated in FIG. 6, the exemplary system 600 includes the remotely controllable device 102, a smartphone 602, and a smartwatch 604 to provide an example. The smartphone 602 and the smartwatch 604 can represent exemplary embodiments of two of the portable electronic devices from among the portable electronic devices 104.1 through 104.n as described above in FIG. 1.

In the exemplary embodiment illustrated in FIG. 6, the smartphone 602 and the smartwatch 604 functionally cooperate amongst themselves to access the remotely controllable device 102. As to be described in further detail below, the smartphone 602 and the smartwatch 604 execute exemplary prioritization routines to identify a preferred portable electronic device from among the smartphone 602 and the smartwatch 604 that is transferred ownership of a software implemented access token to access the remotely controllable device 102. In some embodiments, the smartphone 602 and the smartwatch 604 simultaneously, or near-simultaneously, execute the prioritization routines to identify the preferred portable electronic device. As part of these exemplary prioritization routines, the smartphone 602 and the smartwatch 604 can collect information relating to one or more parameters, characteristics, and/or attributes of the remotely controllable device 102, the smartphone 602, and the smartwatch 604. In some embodiments, the one or more parameters, characteristics, and/or attributes can be related to the motions, or the relative motions, of the smartphone 602 and the smartwatch 604 and/or the communication capabilities, for example, range, of the remotely controllable device 102.

After collecting the information, the smartphone 602 and the smartwatch 604 can evaluate the information to identify the preferred portable electronic device to access the remotely controllable device 102. In some embodiments, the preferred portable electronic device is identified as a portable electronic device from among the smartphone 602 and the smartwatch 604 that is in motion relative to the remotely controllable device 102 and/or is in communication range of the remotely controllable device 102 as indicated by, for example, Received Signal Strength indicators (RSSIs) provided by the smartphone 602 and the smartwatch 604. In some embodiments, the smartphone 602 can be identified as the preferred portable electronic device when the smartphone 602 is in motion relative to the remotely controllable device 102 and is in communication range of the remotely controllable device 102. In some embodiments, the smartwatch 604 can be identified as the preferred portable electronic device when, the smartphone 602 is stationary, or near-stationary, to relative to the remotely controllable device 102 and the smartwatch 604 is in motion relative to the remotely controllable device 102 and is in communication range of the remotely controllable device 102. Once the preferred portable electronic device has been identified, the smartphone 602 and/or the smartwatch 604 transfer ownership of the software implemented access token to the preferred portable electronic device to access the remotely controllable device 102. In some embodiments, this transfer of ownership can be in the form of a pull whereby the preferred portable electronic device transfers ownership of the software implemented access token from a previous preferred portable electronic device from among the smartphone 602 and the smartwatch 604 that presently has ownership of the software implemented access token, but is no longer identified as the preferred portable electronic device. In some embodiments, the smartwatch 604 that has identified as the preferred portable electronic device pulls ownership of the software implemented access token from the smartphone 602 in response to the smartwatch 604 being identified as the preferred portable electronic device. After ownership of the software implemented access token is transferred, the preferred portable electronic device accesses the remotely controllable device as described above in FIG. 1.

Figure 7:
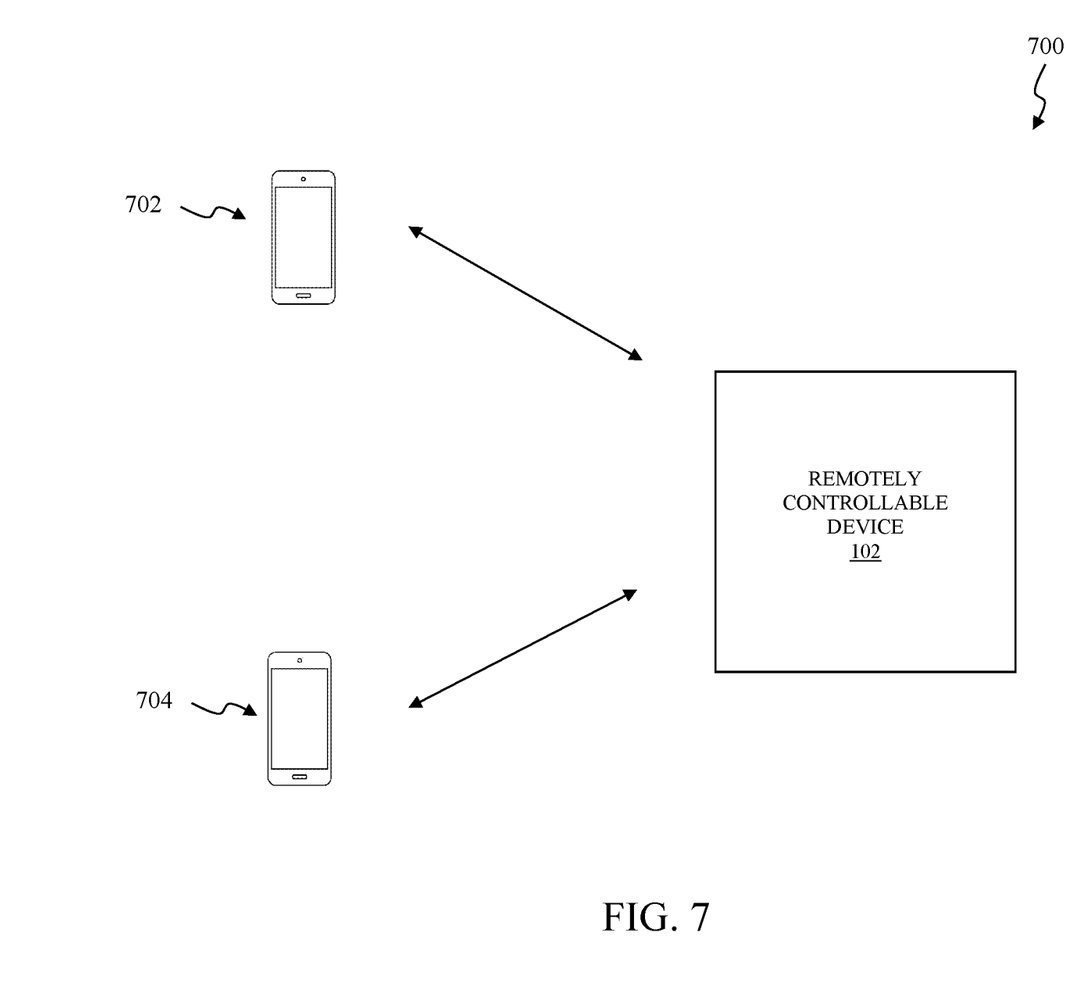
FIG. 7 graphically illustrates a homogenous exemplary system having multiple smartphones in accordance with various embodiments.

FIG. 7 graphically illustrates a homogenous exemplary system having multiple smartphones in accordance with various embodiments. In the exemplary embodiment illustrated in FIG. 7, an exemplary system 700 selectively controls access to a remotely controllable device, such as the remotely controllable device 102 as described above in FIG. 1. As to be described in further detail below, portable electronic devices within the exemplary system 700 functionally cooperate amongst themselves to access the remotely controllable device. These portable electronic devices execute exemplary prioritization routines to identify a preferred portable electronic device from among the portable electronic devices to access the remotely controllable device. Thereafter, the exemplary system 700 transfers ownership of a software implemented access token to the preferred portable electronic device to allow the preferred portable electronic device to access the remotely controllable device. As illustrated in FIG. 7, the exemplary system 700 includes the remotely controllable device 102, a smartphone 702, and a smartphone 704 to provide an example. The smartphone 702 and the smartphone 704 can represent exemplary embodiments of two of the portable electronic devices from among portable electronic devices 104.1 through 104.$n$ as described above in FIG. 1.

In the exemplary embodiment illustrated in FIG. 7, the smartphone 702 and the smartphone 704 functionally cooperate amongst themselves to access the remotely controllable device 102. As to be described in further detail below, the smartphone 702 and the smartphone 704 execute exemplary prioritization routines to identify a preferred portable electronic device from among the smartphone 702 and the smartphone 704 that is transferred ownership of a software implemented access token to access the remotely controllable device 102. In some embodiments, the smartphone 702 and the smartphone 704 simultaneously, or near-simultaneously, execute the prioritization routines to identify the preferred portable electronic device. As part of these exemplary prioritization routines, the smartphone 702 and the smartphone 704 can collect information relating to one or more parameters, characteristics, and/or attributes of the remotely controllable device 102, the smartphone 702, and the smartphone 704. In some embodiments, the one or more parameters, characteristics, and/or attributes can be related to the battery capacities or respective battery charge of the smartphone 702 and the smartphone 704, operating states of the smartphone 702 and the smartphone 704 including low power mode or screen-on, the motions, or the relative motions, of the smartphone 702 and the smartphone 704, the communication capabilities, for example, range, of the remotely controllable device 102 and/or the usages the smartphone 702 and the smartphone 704 including video, audio, and/or data transmissions.

After collecting the information, the smartphone 702 and the smartphone 704 can evaluate the information to identify the preferred portable electronic device to access the remotely controllable device 102. In some embodiments, the preferred portable electronic device is identified as a portable electronic device from among the smartphone 702 and the smartphone 704 that has the higher and/or greater battery capacity or battery charge, is currently screen-on, is in motion relative to the remotely controllable device 102, and/or is not being used for video, audio, and/or data transmissions to provide some examples. Once the preferred portable electronic device has been identified, the smartphone 702 and/or the smartphone 704 transfer ownership of the software implemented access token to the preferred portable electronic device to access the remotely controllable device 102. After ownership of the software implemented access token is transferred, the preferred portable electronic device accesses the remotely controllable device as described above in FIG. 1.

CONCLUSION

Embodiments of the disclosure can be implemented in hardware, firmware, software application, or any combination thereof. Embodiments of the disclosure can also be implemented as instructions stored on one or more computer-readable mediums, which can be read and executed by one or more processors. A computer-readable medium can include any mechanism for storing or transmitting information in a form readable by a computer (e.g., a computing circuitry). For example, a computer-readable medium can include non-transitory computer-readable mediums such as read only memory (ROM); random access memory (RAM); magnetic disk storage media; optical storage media; flash memory devices; and others. As another example, the computer-readable medium can include transitory computer-readable medium such as electrical, optical, acoustical, or other forms of propagated signals (e.g., carrier waves, infrared signals, digital signals, etc.). Further, firmware, software application, routines, instructions have been described as performing certain actions. However, it should be appreciated that such descriptions are merely for convenience and that such actions in fact result from computing devices, processors, controllers, or other devices executing the firmware, software application, routines, instructions, etc.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A first portable electronic device from among a plurality of portable electronic devices for accessing a remotely controllable device, the first portable electronic device comprising:
   a memory that stores a token indicator indicating ownership of a software implemented access token to access the remotely controllable device; and
   a processor configured to execute instructions stored in the memory, the instructions, when executed by the processor, configuring the processor to:
      collect information relating to one or more parameters, characteristics, or attributes of the plurality of portable electronic devices,
      evaluate the information to identify a second portable electronic device from among the plurality of portable electronic devices that is in motion relative to the remotely controllable device, and
      transfer ownership of the software implemented access token from the first portable electronic device to the second portable electronic device in response to identifying the second portable electronic device as being in motion relative to the remotely controllable device to enable the second portable electronic device to access the remotely controllable device.

2. The first portable electronic device of claim 1, wherein the first portable electronic device comprises:
   a smartphone, and
   wherein the second portable electronic device comprises:
   a smartwatch.

3. The first portable electronic device of claim 1, wherein the first portable electronic device comprises:
   a first smartphone, and
      wherein the second portable electronic device comprises:
      a second smartphone.

4. The first portable electronic device of claim 1, wherein the instructions, when executed by the processor, further configure the processor to:
   scan for the remotely controllable device, and
   stop scanning for the remotely controllable device in response to transferring the ownership of the software implemented access token.

5. The first portable electronic device of claim 1, wherein the one or more parameters, characteristics, or attributes of the plurality of portable electronic devices comprise one or more signal characteristics of one or more electronic signals associated with the second portable electronic device.

6. The first portable electronic device of claim 5, wherein the one or more signal characteristics comprise a Received Signal Strength Indicator (RSSI) of an electronic signal received by the first portable electronic device from the second portable controllable device indicating that the second portable electronic device is in motion relative to the remotely controllable device.

7. The first portable electronic device of claim 1, wherein the one or more parameters, characteristics, or attributes of the plurality of portable electronic devices comprise one or more portable electronic device characteristics relating to configuration or operation of the second portable electronic device.

8. The first portable electronic device of claim 7, wherein the one or more portable electronic device characteristics comprise motion of the second portable device relative to the remotely controllable device.

9. The first portable electronic device of claim 1, wherein the instructions, when executed by the processor, configure the processor to transfer ownership of the software implemented access token from the first portable electronic device to the second portable electronic device in response to identifying the second portable electronic device as being within communication range of the remotely controllable device.

10. The first portable electronic device of claim 1, wherein the remotely controllable device comprises a vehicle.

11. A method for accessing a remotely controllable device, the method comprising:
   collecting, by a first portable electronic device from among a plurality of portable electronic devices, information relating to one or more parameters, characteristics, or attributes of the plurality of portable electronic devices;
   evaluating, by the first portable electronic device, the information to identify a second portable electronic device from among the plurality of portable electronic devices that is in motion relative to the remotely controllable device; and
   transferring, by the first portable electronic device, ownership of a software implemented access token from the first portable electronic device to the second portable electronic device in response to identifying the second portable electronic device as being in motion relative to the remotely controllable device to enable the second portable electronic device to access the remotely controllable device.

12. The method of claim 11, further comprising:
   scanning, by the first portable electronic device, for the remotely controllable device, and
   stopping, by the first portable electronic device, the scanning for the remotely controllable device in response to transferring the ownership of the software implemented access token.

13. The method of claim 11, wherein the one or more parameters, characteristics, or attributes of the plurality of portable electronic devices comprise one or more signal characteristics of one or more electronic signals associated with the second portable electronic device.

14. The method of claim 13, wherein the one or more parameters, characteristics, or attributes of the plurality of portable electronic devices comprise one or more signal characteristics of one or more electronic signals associated with the second portable electronic device.

15. The method of claim 11, wherein the one or more parameters, characteristics, or attributes of the plurality of portable electronic devices comprise one or more portable electronic device characteristics relating to configuration or operation of the second portable electronic device.

16. The method of claim 15, wherein the one or more portable electronic device characteristics comprise motion of the second portable device relative to the remotely controllable device.

17. The method of claim 11, wherein the transferring comprises:
   transferring ownership of the software implemented access token from the first portable electronic device to the second portable electronic device in response to identifying the second portable electronic device as being within communication range of the remotely controllable device.

18. The method of claim 11, wherein the remotely controllable device comprises a vehicle.

19. A smartphone for accessing a vehicle, the smartphone comprising:
 a memory that stores a token indicator indicating ownership of a software implemented access token to access the vehicle; and
 a processor configured to execute instructions stored in the memory, the instructions, when executed by the processor, configuring the processor to:
  collect information relating to one or more parameters, characteristics, or attributes of the vehicle and a smartwatch,
  evaluate the information to identify that the smartwatch is in motion relative to the vehicle, and
  transfer ownership of the software implemented access token from the smartphone to the smartwatch in response to identifying the smartwatch as being in motion relative to the vehicle to enable the smartwatch to access the vehicle.

20. The smartphone of claim 19, wherein the instructions, when executed by the processor, configure the processor to transfer ownership of the software implemented access token from the smartphone to the smartwatch in response to identifying the smartwatch is within communication range of the vehicle.

* * * * *